July 27, 1965     J. B. GLANCY     3,196,833
METHOD OF RAISING SHELLFISH SEED IN A SIMULATED HABITAT
Filed June 12, 1961
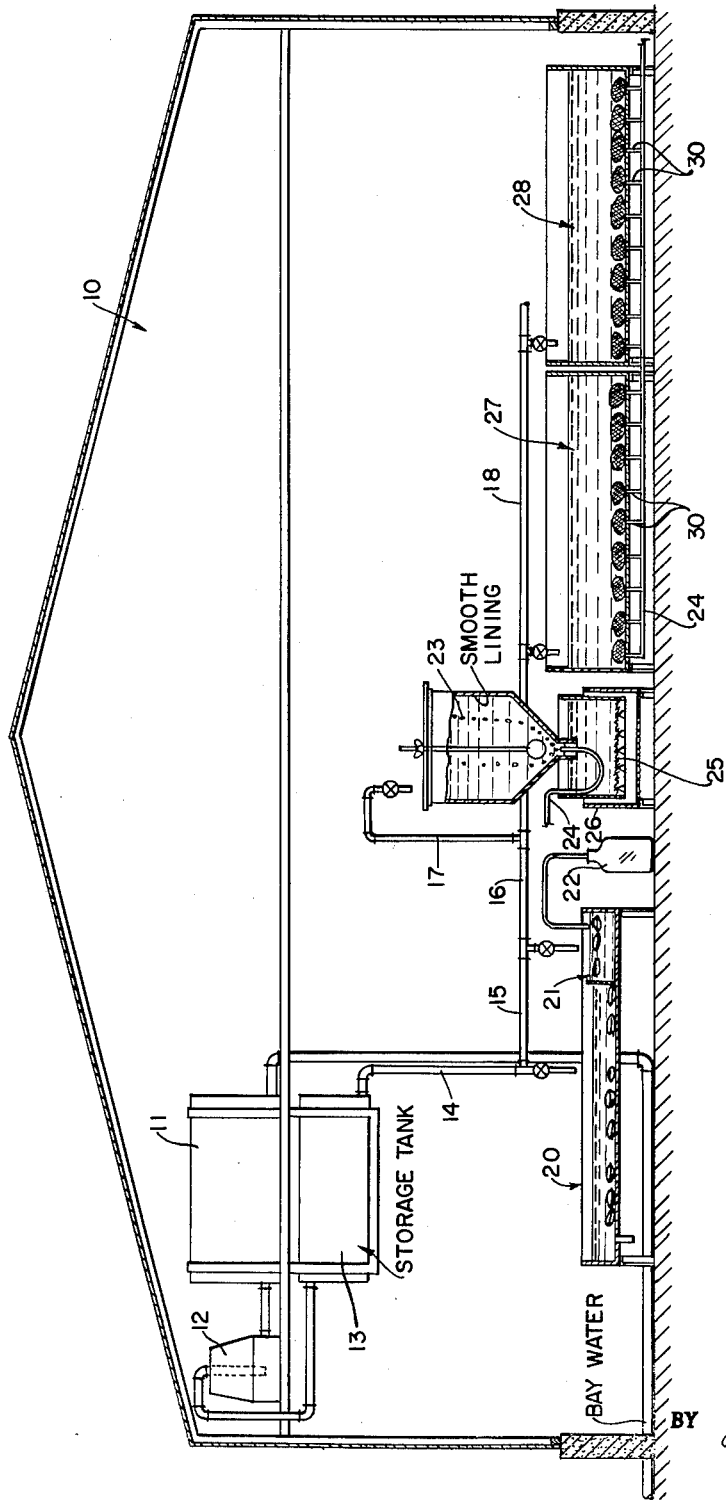
INVENTOR.
JOSEPH B. GLANCY
BY *Darby & Darby*
ATTORNEYS

United States Patent Office 3,196,833
Patented July 27, 1965

3,196,833
METHOD OF RAISING SHELLFISH SEED IN A SIMULATED HABITAT
Joseph B. Glancy, Northport, N.Y., assignor to Sun-Lab Shellfish, Inc., West Sayville, N.Y., a corporation of New York
Filed June 12, 1961, Ser. No. 116,245
12 Claims. (Cl. 119—4)

This invention relates to a method of producing shellfish seed, such as the seed of oysters, clams, mussels, scallops, and like.

During the past fifty years, the shellfish industry in the United States and generally throughout the world has been steadily declining, as indicated by the steady decline in marketable catch each year. The oyster-producing or "farming" industry in particular has declined to such an extent that oysters, which at one time were considered a regular part of the diet of the average family residing a reasonable distance from a producing area, have now been relegated to the class of a luxury or delicacy. Among the chief reasons for the decline in oyster farming and other shellfish producing industries is the fact that shellfish culture is at best a precarious undertaking, due to the large number of conditions affecting the "crop" which are beyond the control of the producers. In many respects, oyster farming is similar to land farming in that the unpredictable forces of nature may combine to decimate or even totally destroy a crop representing the farmer's efforts for one or more years. For example, young, growing oysters are subject to the depredations of natural marine enemies, such as drills and starfish, which may descend in such numbers upon an oyster bed as to totally destroy the oyster crop being cultivated there. While the forces of science and technology have contrived to make some advances in oyster growing techniques, a major problem remains unsolved. This problem is the production of so-called "seed oysters."

In general, oyster seed may be defined as young oysters, one-seventy-fifth of an inch to one inch in size which are "planted" by oyster farmers in beds situated in suitably protected areas of natural oyster growing waters. Oysters of this size are grown by the producers to marketable size in accordance with well-known techniques, which may include one or more transplantings of the oysters from one bed to another to escape infestations of marine enemies or to obtain a more satisfactory growing environment. Although the modern oyster farmer is usually able to grow seed oysters to a marketable size with a reasonable degree of success, his control over the production of oyster seed is extremely limited. Essentially, the present practices of the industry for growing oyster seed are substantially those followed since the beginning of recorded history. These practices consist merely of seeking out the natural spawning grounds of the oyster, providing a clean bed, planting "cultch" material for the oyster larvae to set on, and collecting as many as possible of the seed oysters for transplanting to other, more favorable, growing grounds where the seed oyster is grown to a marketable size. Unfortunately, the number of seed oysters produced at the natural spawning grounds is dependent upon such critical factors as water temperature, water salinity, and the presence or absence of marine organisms which may destroy the seed. As a result, an oyster farmer may expend a great deal of money in preparing a natural spawning ground for a collection of oyster seed without any assurance that his efforts will meet with success. In fact, due to a combination of natural conditions, a particular spawning ground may not produce a yield of oyster seed for several successive years, so that the returns for the farmer's labor are in the nature of a "gamble."

For many years, much time and energy have been expended in seeking practical methods of artifically producing seed oysters. The methods developed usually involve selecting suitable strains of oysters and inducing them to spawn under controlled conditions. For example, a commonly accepted method comprises taking the selected male and female oysters and placing them in tanks of water, where spawning is induced through well-known "preconditioning" techniques involving a cyclic variation of water temperature. The oyster embryos and larvae which result are then placed in tanks of almost sterile water and supplied with artificially grown food until they set and reach seed oyster size, at which time they are transferred to the natural growing beds in the open waters of a bay, for example. Unfortunately, methods of this type have proven to be both unsuccessful and impractical due to uncontrollable water toxicity and the great expense involved in artificially preparing the foods needed by the oyster larvae.

Accordingly, it is an object of this invention to provide a practical method of producing seed shellfish, such as oyster, clam, mussel and scallop seed, and the like, which method is relatively simple and inexpensive to practice and which insures the production of a steady output of seed of suitable quality and size.

It is a further object of this invention to provide a method of producing oyster seed, which method permits the economical production of selected, disease-resistant strains of seed oysters in almost unlimited numbers.

Other objects and features of the invention will become apparent when the following description is considered in connection with the appended drawing, the single figure of which illustrates one form of suitable apparatus for performing my method of producing shellfish seed.

Briefly, the method of the invention contemplates that natural oyster growing water, such as bay water, for example, may be used during the production of oyster seed if the toxicity of the water is carefully controlled and the water itself maintained under conditions which provide for an adequate content of natural oyster food within the water itself. In order to accomplish this, the oyster seed production is carried on in tanks or other vessels located within the confines of a "greenhouse" type of solar radiation-admitting enclosure. The natural oyster growing water employed in the tanks in the greenhouse is treated by centrifuging to remove silt and the natural marine enemies of the oyster larvae without removing the relatively lighter natural oyster food, such as plankton, for example, which is present in the water.

The process starts by collecting spawn from selected strains of oysters and fertilizing the eggs by the addition of sperm in accordance with known techniques. After fertilization, when the oyster embroys or larvae begin to swim, they are transferred to larval tanks wherein the swimming larvae are cultivated until they reach setting size. During the larval period, the treated water in the tanks is changed daily, or more often, to provide the necessary supply of food for the larvae and to minimize the toxic level of the water. When the larvae grow to a setting size, for example, when they may be held in a number 70 standard screen, they are ready for setting and are transferred to setting tanks located within the greenhouse. Mesh bags filled with cultch, such as mollusk shells, for example, are placed in the setting tanks with the larvae and the tanks supplied with treated water, so that the larvae attach themselves to the cultch where they become known as "set" or "spat." When the setting concentration reaches a suitable level, for example, about twenty spat per shell, the cultch with attached oyster set is taken from the setting tanks and transferred to a protected area of the natural oyster growing grounds. Since the oyster set are still of a relatively small size, the bags of cultch are suspended from floats or other support devices in the protected area of the oyster growing grounds to protect the spat from natural marine enemies and adverse water conditions. Finally, when the suspended spat or set reach about one-eighth inch in size or larger, they are removed from the suspension devices and the cultch shells are then spread on the natural oyster growing grounds for cultivation to market size in accordance with known techniques.

The method of the invention also makes provision for the resetting of oyster set which have set on the inner surfaces or walls of the setting tanks rather than on the cultch material. This is accomplished by brushing the walls of the setting tanks to remove the set and then recovering the removed set by means of screening. The brushed-off oyster set is then sprinkled at a desired concentration on cultch material in resetting tanks, where the set resets itself within a period of about four days. The cultch having the reset spat is then transferred to the protected area of the natural growing grounds in the same manner as the cultch from the setting tanks.

In practicing the method of the invention, it is important to note that the larvae are grown in contaminant free water that is relatively free from toxicity or the so-called "toxic metabolite factor" and that the whole process, from fertilization of the eggs to setting of the larvae, is carried on in a solar radiation-admitting enclosure which permits the tanks employed in the process to be exposed to the direct rays of the sun and sky. During the many attempts at artificial production of oyster seed, the scientists and researchers were unaware of the extreme sensitivity of young larvae to toxic metabolites and explained the failure of their methods on the theory that the oyster larvae died of starvation because of a lack of natural food. Accordingly, the trend of research at the present time is directed towards methods of artificially producing food for addition to the filtered or sterile water used during the larval period. The growing and preparation of such oyster food is difficult because exact concentrations of chemicals must be maintained. Additionally, it is quite expensive. For example, the two best foods discovered thus far are *Isochrysis galbana* and *Monochrysis lutheri,* both of which must be grown in bacteria-free cultures at controlled temperatures. Obviously, this procedure is beyond the capabilities of the average oyster farmer. The method of the invention, of course, does not depend upon the addition of artificially prepared food to the water used in the process, but rather utilizes the natural larval food present in the natural oyster growing water which is employed in the process. It will be understood, however, that artificially prepared foods may be added to the culture water, if desired. Accordingly, the present method is simple and quite economical as compared to even the usual oyster seed collection process wherein selected areas of natural oyster growing grounds are prepared and maintained as spawning grounds.

By maintaining the natural oyster growing water employed in the method of the invention in a non-toxic state, through the observance of scrupulous cleanliness throughout the performance of the method, and by constant cleaning of the tanks and other equipment employed, an extremely low mortality of oyster larvae is experienced. Consequently, the natural food present in the water employed in the process is more than sufficient to permit adequate growth of the oyster larvae. The problem of separating the natural food present in the water from silt and marine enemies, such as worms, jelly fish, and small crustacea, is immeasurably simplified by use of a centrifuge to treat the natural sea water employed in the process. In the centrifuging action, the silt and natural marine enemies of the larvae are eliminated, but the relatively lighter natural food present in the water, such as plankton, for example, is retained.

By utilizing a "greenhouse" type of enclosure in the method of the invention, three important advantages are obtained. First, the solar radiation, including sunlight, admitted by the roof and walls of the enclosing structure, tends to prevent toxic metabolite factors from entering the culture system. Second, the sunlight raises the water temperatures in the culture tanks somewhat above the normal environmental temperature to which the oysters being grown are accustomed, thereby causing the larvae to grow and set more rapidly. This, of course, has the effect of increasing tank capacity as well as lengthening the annual "season" of seed production. Third, by subjecting the culture tanks to the radiation from sun and sky, the rate of photosynthesis is increased so that an increased food supply is made available in the water of the culture tanks.

Although the concept of performing the method within an enclosure which admits the rays of sun and sky at first impression appears to be relatively simple, it has long eluded the grasp of researchers in this field. The hitherto prevailing thought on this subject was that the action of the sunlight was harmful, rather than beneficial, in that it tends to stimulate the production of toxic factors in the culture water. Accordingly, research has been conducted by subjecting the culture tanks to artificial light under normal laboratory conditions. Furthermore, the use of a greenhouse type of enclosure permits great economies to be effected in oyster seed production. The culture water temperature is raised to thereby increase the propagation and growth rates of the oyster larvae, so that the production rate for tanks of a given size is materially increased.

In order to more fully understand the objects, features and advantages of the method of the invention, a detailed description of the method will now be given for the production of seed oysters of the species known as *Crassostrea virginica,* which is one of the more commonly cultivated species in the eastern part of the United States. The equipment for practicing the method is most suitably located adjacent the waters of a natural oyster growing area, so that a steady supply of natural oyster growing water is readily and economically available. The operations may be carried on in a greenhouse type of enclosure 10 having the roof and walls formed of panels of a transparent material, such as glass or a transparent plastic, for example. The water employed in the process is fed to the tanks and other equipment by a gravity system from a raw water storage tank 11 which may be elevated about 25 feet above ground. The raw bay or ocean water flows by gravity to centrifuging equipment 12 which functions to remove the natural marine enemies of the oyster, embryos and larvae, such as worms, jellyfish and crustacea, while retaining the natural oyster food present in the water. It is necessary to remove such animal forms because some have the power to prey on oyster larvae, and almost all of these marine enemies feed on the same food as the oyster larvae. Although other means, such as filters or screens, for example, may be used to prepare the culture water, centrifuges are far more practical because they do not clog easily and, in addition, remove the unwanted animal life completely while still retaining an ample natural food supply for the oyster larvae. The treated culture water from the centrifuge is passed by gravity to a culture water storage tank 13 which has a plurality of hose lines 14, 15, 16, 17 and 18 leading to the various spawning, larval and setting tanks. All of the tanks are located within the greenhouse enclosure, so that the ambient temperature for the tanks is substantially higher than the temperature of the atmosphere. For example, in an experimental laboratory set-up at West Sayville, Long Island, New York, the use of a greenhouse type of enclosing structure produced a rise in temperature of about 12° F. over that in a conventional building without heat.

As a first step in the process, selected ripe or conditioned oysters are placed in a shallow black trough or tank 20 in the greenhouse structure and a flow of treated water from the culture storage tank of about one gallon per minute is passed through the trough. When the oysters begin to feed normally within the trough, oyster sperm is added to the trough water. Within about fifteen minutes, the oysters in the trough will begin to spawn. It is necessary when the males spawn to remove them to another vessel immediately, as the sperm emitted would soon render the water opaque, thereby making it difficult to ascertain which oysters in the trough are spawning. Furthermore, the presence of too much sperm may later adversely affect the oyster embryos. When a female starts spawning, it is transferred to a pan 21 in the trough with a flow of water through the pan. The fertilized eggs are then siphoned from the pan into a five-gallon glass carboy, which is left in the sunlight. In about three hours, the embryos begin to swim and stream, with an action which is visible to the naked eye. Then the embryos or larvae are slowly siphoned from the carboy into a larval tank 23 with a capacity of about 110 gallons, taking care that the siphon does not remove the settled material at the bottom of the carboy which may contain toxic elements. It may be noted that this species of oyster, namely, the *Crassostrea virginica* species, normally spawns when the water temperature in its natural environment reaches about 68° F. In the spawning trough of the greenhouse, the water temperature may reach 80° F., so that spawning activity is markedly increased. It will be understood, of course, that for other species of oysters, or other types of shellfish, the water temperature could be suitably varied. For example, English oysters are usually found in waters having a lower temperature, so that the greenhouse temperature may be somewhat lower for this species.

The larval tanks employed in the method of the invention are cylindrical in shape and have a truncated conical bottom. In general, the size and shape of the tanks are governed by factors such as ease of screening and cleaning. It is quite important that the interior surface of the tanks be very smooth and impervious, so that premature setting of the oyster larvae is discouraged. To this end, plastic materials such as Teflon, polyvinyl or polyethylene may be employed. Each of the larval tanks is closed at the bottom by a rubber plug flush with the bottom of the tank, so that no pockets are formed into which the larvae could settle. Each of the rubber stoppers is fitted with an air tube 24 to supply a steady stream of air bubbles into the tank. The resultant aeration of the larval tanks is important for several reasons:

First, it insures an adequate supply of oxygen in the culture water to aid in preventing water toxicity. Second, the water currents set up by the stream of air bubbles keep the larvae in motion at all times and assure an even distribution or density of the larvae throughout the tank, so that the natural food in the water is evenly available to all the larvae. Third, the currents set up by the stream of air bubbles tend to propel the larvae within the tank with a swimming motion, with the expenditure of little, if any, energy by the larvae itself. Since oyster larvae must swim in order to feed, the resultant artificial motion is most beneficial. Fourth, the even distribution of larvae within the tank facilitates periodic testing of the larval concentration within the tank.

When the mobile oyster embryos are introduced into the first larval tank, they proceed to grow in size as they feed upon the natural food present in the tank water. The larval concentration in a larval tank one day after spawning has taken place may be approximately 300 "straight-hinge" larvae per 10 ml. Inasmuch as these larvae are still absorbing their yokes and require little, if any, additional food, it is only necessary to divide the contents of the tank equally into another tank of the same size and to fill both tanks with fresh culture water. The following day, the larvae are screened out of the tanks using a number 325 standard screen such as screen 25 having 325 meshes per inch. Thereafter, each day, the larvae in each larval tank are screened out of the spent culture water and put back into the tank with a fresh supply of culture water. It is, of course, quite important that the interior surfaces of the larval tanks be scrubbed at least once a day and the settlement in the bottom of each tank discarded after the screening operation, so that water toxicity is minimized. In general, the swimming or motile larvae are kept in the larval tanks about eight days to two weeks until they reach setting size. During this time, the larvae grow in size and consequently require more food. With the method of the invention, this increase in food supply may be met merely by supplying more treated water to the tanks. Alternatively, the larval density of each tank may be reduced to secure the same effect. It has been determined in practice that the concentration of larvae per 10 ml. in the tanks should be maintained as follows:

|  | Larvae per 10 ml. |
| --- | --- |
| 1st day | 300 |
| 2nd day | 150 |
| 3rd day | 100 |
| 4th day | 75 |
| 5th day | 50 |
| 6th day | 40 |
| 7th day | 30 |
| 8th day | 20 |
| 9th day | 15 |

Usually, by the eighth or ninth day, some of the fastest growing larvae have reached the setting stage and have attained a size wherein they are large enough to be held in a number 70 standard screen with 65 meshes per inch. At this time, the larvae are known as "eyed larvae" because a small black spot appears on each oyster which indicates that the oyster is ready to set by attaching itself to a fixed object in the water. It should be pointed out that during the changing of the water in each larval tank care must be exercised to prevent physical damage to the larvae in the water. To this end, it has been found expedient to close the bottom of each tank with a "ball" valve arrangement, so that the tank opening is partially closed to lessen the flow of water when the rubber closure plug is removed. The water issuing from the bottom of the tank is passed through the aforementioned screens 25, which vary in size with the size of the growing larvae, so that the larvae are retained within the screen, while the spent culture water is disposed of. In order to prevent the rush of water from the bottom of the tank from crushing the larvae against the surface of the screen, the mesh screens 25 are positioned in a pan 26 of water which is placed below the outlet of the larval tank, so that the surface of the mesh screen is below the surface of the water in the pan. This permits the water in the pan above the screen to act as a cushion to prevent damage to the larvae arising from the larvae striking the screen. Thus, the rate of screening is greatly increased and the spent water from the larval tank rapidly removed from the tanks. When the water has been removed from the larval tank, the tank is again closed, fresh water introduced, and the larvae collected in the screen placed back into the tank for further growth. During this period of growth in the larval tanks of which only one, 23, is shown in the drawing, the oyster larvae are provided with an abundant supply of natural food in the treated culture water within the tanks. The action of the sunlight stimulates production of the food in the tank water and also serves to reduce the toxicity of the water as explained previously. Furthermore, the growing oyster larvae are provided with an environment which is free from natural marine enemies, so that the mortality rate for the larvae is kept at an extremely low level.

After the larvae reach the setting size wherein they may be held in a number 70 standard screen, they are transferred to the setting tanks 27 and 28. In the setting tanks, which may be troughs, for example, the treated water is also changed every 24 hours, or more often, and scrupulous cleanliness maintained. It should be pointed out that scrupulous cleaning in this method involves flushing all tanks used in the system to discard any settlings, even though they contain seemingly healthy larvae, and then scrubbing each tank thoroughly before use. Coarse mesh bags filled with cultch material and designated 30, such as oyster or clam shells, for example, are placed within the setting tanks and a constant stream of air bubbles from air supply pipe 24 introduced to provide aeration. The use of aeration in the setting tanks is quite important because it permits the food supply in the water to be circulated evenly throughout the tank, so that the oysters which have set and are consequently immobile, are assured of a constant supply of food. Again, the interior surface of the setting tank should be fabricated of a smooth, impervious surface to discourage setting of the oysters upon surfaces other than those provided by the cultch itself. Preferably, the concentration of larvae in the setting tanks is maintained at about 2 per 10 ml. Under normal circumstances, most of the larvae in the setting tanks set within two days by attaching themselves to the cultch material, where they become known as spat. Although the water currents created by aeration of the setting tanks trend to cause an even distribution of larvae set on the surface of the cultch, the cultch itself may obstruct the water currents and thereby cause the larvae to congregate in the current-free shell depressions. This may produce a very uneven setting pattern on the cultch, with as many as 100 set per square inch in the "cupped" depressions. Since this is most wasteful of larvae and cultch shells, in accordance with the method of the invention the bags of cultch may be moved occasionally to assure a more even set distribution. Although the cultch may be moved manually, it is preferably moved by means of a slowly moving mechanical conveyance. It is suggested that the surface of the cultch not be moved faster than approximately one inch per minute.

When about one dozen set appear on each side of each shell, the bags of cultch are removed from the setting tanks and greenhouse structure and placed in a protected area of the bay or other natural oyster growing water. Since the existence of an oyster immediately after setting is extremely precarious, a practical method for producing oyster seed could not be successful unless some provision were made to protect the young set from enemies and to place the immobile set in an environment where water currents bring food to the set and at the same time remove any feeding deposits which may accumulate, to thereby prevent the oyster set from smothering. It is not at all unusual to see heavy sets of oysters disappear entirely within a week after setting in their natural environment because of predators, lack of food, and smothering. Accordingly, in the method of the invention, the bags of cultch with the oyster set thereon are removed from the setting tanks and suspended from rafts or floats in a protected area of the natural oyster growing waters, where water currents exist which provide the necessary circulation of food to the set and prevent accumulation of feeding deposits. Since the oysters are suspended from the rafts, marine enemies which must reach their prey by crawling, such as drills or starfish, are prevented from reaching the set. Another arrangement which may be used to protect the young set is a collector stand of the type described in U.S. Patent Number 2,853,049, issued September 23, 1958, to Joseph B. Glancy, wherein the collector stands are adapted to be placed on the ocean or bay bottom and include means to prevent crawling marine predators from reaching the bags of cultch suspended on the collector.

The young spat remains suspended from the rafts or other apparatus for about ten days, at the end of which period the spat have reached a size of about one-eighth inch or larger. At this time, the oyster seed may be placed in the regular channels of cultivation which are familiar to oyster farmers and producers. When the oyster seed reaches this size, it is usually big enough to successfully protect itself from marine enemies and diseases on the natural oyster growing grounds. In accordance with present well-known techniques, the seed oysters may be transplanted several times from one oyster bed to another to provide environmental conditions which are satisfactory for each phase of the oyster's development. For example, the mesh bags filled with cultch may be removed from the float or raft at the end of the ten-day period and then placed on the aforesaid collector stands in the deeper waters of the bay for a period of about five weeks, until they reach a size of about three-fourths inch. The bags are then removed from the collectors, opened, and the cultch shells with the young oysters attached spread on a clean bottom in the oyster growing beds of the area. After one or more subsequent transplantings of the oysters to different beds, the oysters reach marketable size and are distributed through the usual commercial channels to the consumer.

As pointed out previously, the interior surfaces of the setting tanks in the greenhouse should be very smooth, to discourage the larvae from setting on the walls of the tank rather than on the cultch. Although most of the larvae in the setting tanks set on the cultch, some however set on the walls of the tank. These oyster set must be removed daily or they will continue to grow and capture the larval food intended for the larvae ready to set, or may even ingest the larvae itself. The method of the invention also provides a means of saving this set which has attached itself to the tank walls. After the cultch with the set is taken from the setting tanks for suspension from the rafts in the natural oyster growing waters and the remaining swimming or unset larvae screened out, the sides and bottom of the setting tanks are brushed to dislodge the improperly set spat. The dislodged set is then recovered by screening and sprinkled uniformly on cultch which covers the bottom of shallow "resetting" tanks or troughs. A flow of treated sea water is constantly maintained in the resetting tanks. Within about four days, the set will re-attach itself to the cultch material and the cultch may then be suspended from the rafts in the outside water. Furthermore, any spat which may metamorphose, i.e., change from swimming larvae to post-larval spat without apparent attachment, can be recovered in the rinsings from the setting tanks prior to brushing off the attached set and can be reset in the resetting tanks. For example, in daily routine operation of the setting tanks, all the swimming larvae and spat which pass through a standard number 50 screen with 48 meshes per inch may be returned to the setting tanks, while the spat retained in the number 50 screen may be sprinkled on the cultch in the resetting troughs. Although the above practice is a preferred one for recovering improperly set oysters, other practices may also be followed. For example, the setting tanks could be fitted with removable liners along the interior surfaces thereof, and the liners could be suspended directly from the rafts with the attached set thereon.

Although the method of the invention has been described particularly with reference to the growing of seed oysters of the *Crassostrea virginica* species, it will be understood that with minor variations in water temperature, concentrations and growing period, the method is equally applicable to the growing of other species of oysters and to other forms of shellfish, such as clams, mussels, scallops, and such other mollusks which set, i.e., attach themselves to cultch material after a free-swimming period as larvae. Additionally, it may be noted that the foregoing method of producing oyster seed utilizes only a single, daily change of water in the larval and setting tanks.

Clearly, the production efficiency of the method could be greatly increased by utilizing a plurality of water changes each day to speed up the growth rate of the larvae, and of course thereby to materially increase the output of the producing system without increasing the physical size of the plant. The increased water changes may be accomplished in a simple manner by causing a continuous flow of fresh culture water to enter at one end of the larval tank and overflow through a weir or siphon at the other end. The larvae in the overflowing water may be retained on a screen placed in an overflowing pan or collector to provide the previously described "cushioning action." The larvae caught by the screen may be continuously fed back to the culture water inflow point by any convenient means. For example, the larvae may be conveyed back by an endless screen belt or may be pumped back by means of a filter pump. If a filter pump is used having a gravity head, and with a flow of about one gallon per minute from the culture water tank, the pump will suck back the larvae from the retaining screen in the spent culture water at a rate of about one-half pint per minute. Accordingly, the amount of spent water returning to the intake point of the tank is only about one-sixteenth of the fresh culture water entering the tank. With such a flow rate, a 300 gallon tank would have approximately four changes of culture water per day. Since such an increase in the culture water supplied provides more natural food for the larvae, a more rapid growth at greater concentrations is permitted, thereby increasing the effective capacity of the tanks and also the plant production of set. In practice, it has been found desirable to operate with batteries of two or more tanks, wherein one tank overflows into the other. The tanks are arranged so that the discharge from the final tank is conveniently located with respect to the culture water inflow to the first tank.

It is believed apparent that many changes could be made in the above-described method for producing seed shellfish and many seemingly different types of physical equipment utilized to practice the method of the invention without departing from the scope thereof. Accordingly, it is intended that all matter contained in the above description shall be interpreted as illustrative and not in a limiting sense.

What is claimed is:

1. The method of producing shellfish seed in a favorable habitat which comprises placing shellfish larvae in a contaminant free and nutrient including environment and exposing the larvae and environment to periods of direct solar radiation.

2. A method of producing shellfish seed which comprises providing a water habitat formed by removing silt and natural shellfish enemies from natural shellfish growing water without disturbing the natural food, excluding contaminants from said habitat by protective enclosure thereof and exposing the habitat and shellfish larvae therein to periods of direct solar radiation.

3. The method of claim 2 wherein said silt and enemies are removed from said water habitat by centrifuging natural shellfish growing water.

4. The method of producing shellfish seed as claimed in claim 2 wherein said water habitat is aerated by passing air bubbles therethrough to cause movement of the larvae and provide a uniform density of larvae in said habitat.

5. The method of producing shellfish seed as claimed in claim 2 comprising the additional step of changing said water at a rate to assure an adequate supply of food for said larvae.

6. The method of producing shellfish seed as claimed in claim 2 wherein the shellfish larvae is obtained by breeding selected strains of shellfish in an identical water habitat within said protective disclosure.

7. The method of producing shellfish seed as claimed in claim 2 wherein said shellfish larvae are provided with a continuous addition of said water habitat and wherein overflow water is screened to recover shellfish larvae therefrom and returning said larvae to said habitat to continue their growth.

8. The method of producing shellfish seed as claimed in claim 2 wherein said water habitat is contained in a vessel having a smooth inner surface to discourage premature setting of larvae on said surface.

9. The method of producing shellfish seed as claimed in claim 2 comprising the additional steps of transferring said larvae to an identical habitat in said enclosure and providing readily transportable setting material in said second habitat to induce said larvae to set thereon.

10. The method of producing shellfish seed claimed in claim 9, further comprising the step of transporting said setting material with the shellfish set thereon to a protected area of natural shellfish growing grounds for growth of said shellfish set to usable shellfish seed size.

11. The method of producing shellfish seed as claimed in claim 10 wherein the water in said first and second habitats is aerated by forcing air bubbles therethrough to assure uniform density of larvae.

12. The method of producing shellfish seed as claimed in claim 10 wherein the setting material is periodically moved to assure a uniform density of oyster set thereon.

References Cited by the Examiner

UNITED STATES PATENTS

| | | | |
|---|---|---|---|
| 1,933,950 | 11/33 | Wells | 119—4 |
| 2,853,049 | 9/58 | Glancy | 119—4 |
| 2,920,606 | 1/60 | Anderson | 119—2 |
| 2,944,513 | 7/60 | Keely | 119—3 |
| 2,984,207 | 5/61 | Drake | 119—2 |

FOREIGN PATENTS 722,210   12/31   France.

OTHER REFERENCES

Bur. of Fisheries Doc., No. 961—G.P.O. Washington, D.C., 13 pages 119-4 (dated 1924).

Conservation Commission State of N.Y., 15th Annual Report 1925 (1st 18 pages).

The Conservationist, October 1920, by Wm. Firth Wells (3 pages).

Industrial Progress, November 1883 (page 251).

Guide Book of Shedd Aquarium, Chicago, Ill. (pages 08–11)

SAMUEL KOREN, *Primary Examiner.*

CARL W. ROBINSON, ALDRICH F. MEDBERY,
*Examiners.*